United States Patent [19]

Masuda

[11] Patent Number: 5,000,131
[45] Date of Patent: Mar. 19, 1991

[54] EXHAUST PORT CONTROL VALVE FOR TWO STROKE ENGINE

[75] Inventor: Tatsuyuki Masuda, Iwata, Japan

[73] Assignee: Yamaha Hatsudoki Kabushiki Kaisha, Iwata, Japan

[21] Appl. No.: 470,821

[22] Filed: Jan. 26, 1990

[30] Foreign Application Priority Data

Feb. 6, 1989 [JP] Japan .................................... 1-25699

[51] Int. Cl.$^5$ .............................................. F02B 27/04
[52] U.S. Cl. ................................ 123/65 PE; 123/323; 123/190 A
[58] Field of Search ............... 123/65 R, 65 PE, 65 V, 123/65 EM, 323, 190 R, 190 A, 80 R, 80 BA, 80 BB

[56] References Cited

U.S. PATENT DOCUMENTS

| | | | |
|---|---|---|---|
| 1,283,028 | 10/1918 | Arnould | 123/190 R |
| 1,361,236 | 12/1920 | Elliott | 123/190 A |
| 1,997,491 | 4/1935 | Kemp | 123/190 A |
| 4,121,552 | 10/1978 | Mithuo et al. | 123/65 PE |
| 4,541,371 | 9/1985 | Kageyama et al. | 123/65 PE |
| 4,887,567 | 12/1989 | Matsuura et al. | 123/190 A |

FOREIGN PATENT DOCUMENTS

| | | | |
|---|---|---|---|
| 0156924 | 8/1985 | Japan | 123/65 PE |
| 0035024 | 2/1987 | Japan | 123/65 PE |
| 0272916 | 11/1988 | Japan | 123/65 PE |
| 138904 | 5/1921 | United Kingdom | 123/190 A |

*Primary Examiner*—David A. Okonsky
*Attorney, Agent, or Firm*—Ernest A. Beutler

[57] ABSTRACT

A two cycle crankcase compression diesel engine having a supplemental exhaust port system that is formed in a straight line perpendicular to the cylinder bores and which intersects the main exhaust ports. An exhaust control valve arrangement is provided for controlling the flow through the supplemental exhaust ports to reduce the compression ratio under high load, high speed running conditions. The supplemental exhaust control valves comprise a plurality of individual valves each contained within a common bore extending through the cylinder and interconnected by connecting members that permit axial and circumferential misalignment so as to accommodate for distortion and avoid sticking of the valves.

8 Claims, 5 Drawing Sheets

EXHAUST PORT CONTROL VALVE FOR TWO STROKE ENGINE

BACKGROUND OF THE INVENTION

This invention relates to an exhaust port control valve for a two stroke engine and more particularly to an improved control valve assembly for a multiple cylinder engine.

It has been proposed to employ a control valve and supplemental exhaust port system for two cycle crankcase compression engines and particularly those operating on the diesel principal so as to permit lowering of the compression ratio under certain running conditions to improve performance. For example, the high speed performance of the engine can be improved by opening the supplemental exhaust ports and reducing the compression ratio. However, the operation of these exhaust control valves can be quite critical due to the extreme conditions under which they operate. This is particularly true in conjunction with multiple cylinder engines wherein a plurality of exhaust ports need be controlled. Although a convenient valve assembly may be provided that consists of a cylindrical valve element that is supported in a bore in a cylinder for controlling all of these ports, distortion of the cylinder due to heat and bolt down loadings of the cylinder head can give rise to erratic operation or valve sticking.

It is, therefore, a principal object of this invention to provide an improved exhaust control valve for a multiple cylinder.

It is a further object of this invention to provide an improved exhaust control system for a two cycle internal combustion engine wherein the valve can offer smooth and consistent operation.

SUMMARY OF THE INVENTION

This invention is adapted to be embodied in an exhaust control valve arrangement for an internal combustion engine having a plurality of cylinders each receiving a respective piston. An exhaust port extends from each of the cylinders for delivering exhaust gases to the atmosphere. A bore extends through the cylinders and intersects each of the exhaust ports. A plurality of rotatable valve members are received in the bore for controlling the flow through respective of the exhaust port. Means couple the valve members for simultaneous rotation while permitting relative movement of the valve members for accommodating distortion of the cylinders.

DETAILED DESCRIPTION OF THE PREFERRED EMBODIMENT OF THE INVENTION

Figure 1:
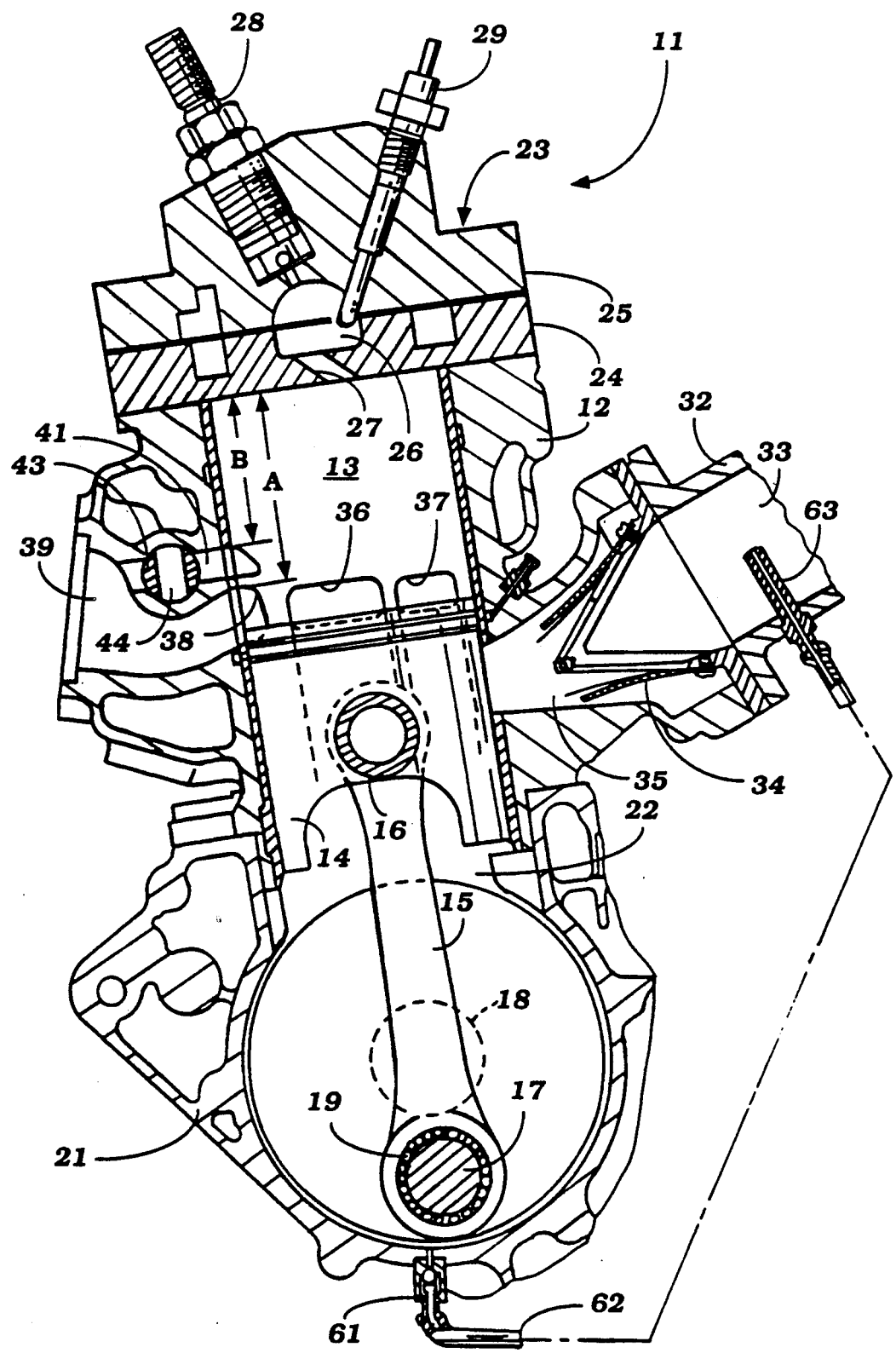
FIG. 1 is a cross sectional view taken through a single cylinder of a multiple cylinder two stroke diesel engine constructed in accordance with an embodiment of the invention.

Referring in detail to the drawings of a three cylinder, two cycle, crankcase compression, diesel engine identified generally by the reference numeral 11. Although the engine 11 is of this configuration, it should be readily apparent to those skilled in the art how the invention can be practiced in conjunction with engines having any type of cylinder configuration or number of cylinders.

The engine 11 is comprised of a cylinder block 12 having three aligned cylinder bores in which pressed in cylinder liners 13 are provided. A piston 14 is supported for reciprocation in each cylinder liner and is connected to the upper end of a connecting rod 15 by means of a piston pin 16. The lower end of the connecting rod 15 is connected to a throw 17 of a crank shaft 18 by means of a suitable bearing assembly, a roller bearing type assembly 19 is utilized in the depicted embodiment. The crankshaft 18 is supported for rotation relative to the cylinder block 12 and to a crankcase 21 that is affixed to the cylinder block in a known manner.

A crankcase chamber 22 is formed below the piston 14. As is conventional in this type of engine, the individual crankcase chambers 22 associated with each of the cylinder bores 13 are sealed from each other in an appropriate manner.

A cylinder head assembly, indicated that generally by the reference 23 and comprised of a lower spacer plate 24 and a main portion 25 are affixed to the cylinder block 12 in an appropriate manner. The spacer plate 24 and main portion 25 form a swirl type pre-chamber 26 that communicates with the main chamber formed above the head of the piston 14 through a throat section 27.

A fuel charge is admitted to the pre-chamber 26 by an injection nozzle 28 that is affixed to the cylinder head assembly 23 in a known manner. A glow plug assembly 29 is also affixed to the head assembly 23 and extends into the pre-chamber 26 for at least starting operation.

An air charge indicated is delivered to the crankcase chambers 22 by means including an intake manifold 32 having individual intake passages 33 each serving a respective one of the chambers 22. A reed type check valve assembly, indicated generally by the reference numeral 34 is clamped between the intake manifold 32 and an intake passage 35 formed in the cylinder block 12 and which communicates at its downstream end with the crankcase chamber 22 when the piston 15 is above its bottom dead center position by a more than a predetermined amount.

The air charge which has been admitted to the crankcase chambers 22 is compressed therein and is then transferred by a plurality of scavenge or transfer passages 36 and 37 to the area above the piston 14 through respective scavenge ports. At the appropriate position, fuel is injected into the pre-chamber 26 from the nozzle 28 and will burn and then issue into the main combustion chamber for expansion. The burnt charge is then discharged to the atmosphere through one or more main exhaust ports 38 formed in the cylinder liner 13 and which communicates with exhaust passages 39 formed in the cylinder block 12.

It will be noted that the exhaust passage 39 curves somewhat downwardly from the exhaust port 38 and then opens in a wider mouth section that extends upwardly above the exhaust port 38. The top edge of the exhaust port 38 is disposed at a distance A below the lower surface of the cylinder head so as to give a relatively high effective compression ratio for diesel operation.

Figure 3:
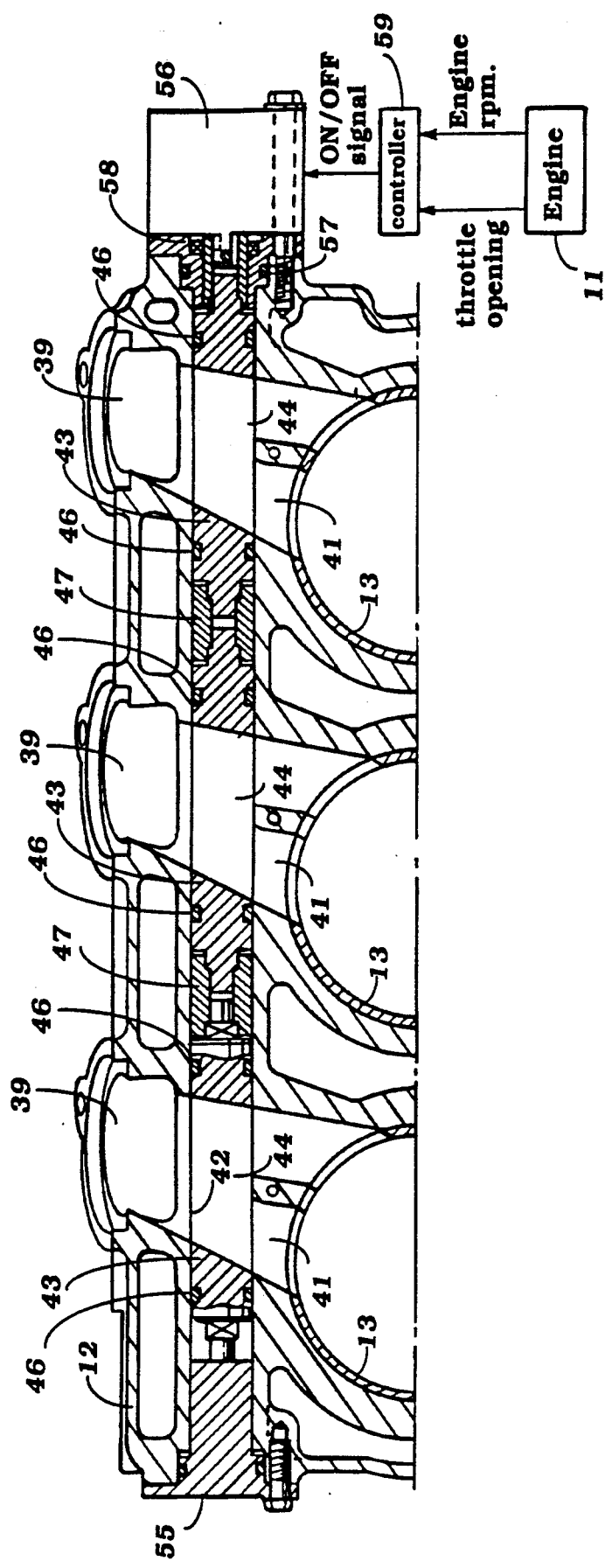
FIG. 3 is a cross sectional view taken along the line 3—3 of FIG. 2 and shows the supplemental exhaust port and exhaust control system.

Specifically, this compression ratio may be in the range of about 20 to 1. Although such a high compression ratios advantageous for starting and under low speed operation, too high of a compression ratio can offer deteriorated engine performance under high load conditions and high speed conditions. In order to provide an effective arrangement for lowering the compression ratio under these conditions, the engine 11 is also provided with an auxiliary or sub-exhaust port 41 which is disposed at a lesser distance B from the lower surface of the cylinder head 23 so as to provide reduced compression ratio. The auxiliary or subexhaust port 41 may be conveniently formed by a machining operation through the opening of the main exhaust passage 39 and the passage 41 can extend in a generally perpendicular direction to the axis of the associated cylinder bore 13. As a result, these ports can conveniently be machined by a cutting tool passing through the exhaust port and have a generally tapered configuration from their inlet end to the outlet end as shown in FIG. 3. It should be noted the ports 41 communicate the cylinder bore with the exhaust passages 39 prior to their exit from the cylinder block 12. Because of their straight configuration, not only can the auxiliary exhaust ports 41 be conveniently formed but also they will have a very low flow resistance and hence high efficiency.

In order to control the opening and closing of the auxiliary exhaust ports 41 there is provided a control valve assembly for each auxiliary exhaust port 41 but these control valves are all interrelated in a matter to be described. In order to accommodate these exhaust control valves, the cylinder block is provided with a transversely extending bore 42 that extends parallel to the axis of rotation of the crankshaft. The bore 42 intersects the auxiliary exhaust passages 41 and has a larger diameter than the height of these passages. Individual control valve elements 43 are rotatably journaled within the bore 42 at each auxiliary exhaust port 41. The control valves 43 have a generally cylindrical configuration and are defined with an opening 44 that has a generally oval configuration when viewed at the side as may be best seen in FIG. 4. When the valves 43 are moved to the position shown in FIG. 2, they will be open and substantially unrestricted flow can pass through the auxiliary exhaust port 41. When the valves 43 are rotated through 90 degrees to their closed position (FIG. 1), they will substantially preclude any flow through the auxiliary exhaust ports 41.

The valves 43 have grooves 45 formed at the opposite sides of the openings 44 and O-ring seals 46 are provided in these grooves for effecting sealing against side leakage.

Figure 4:
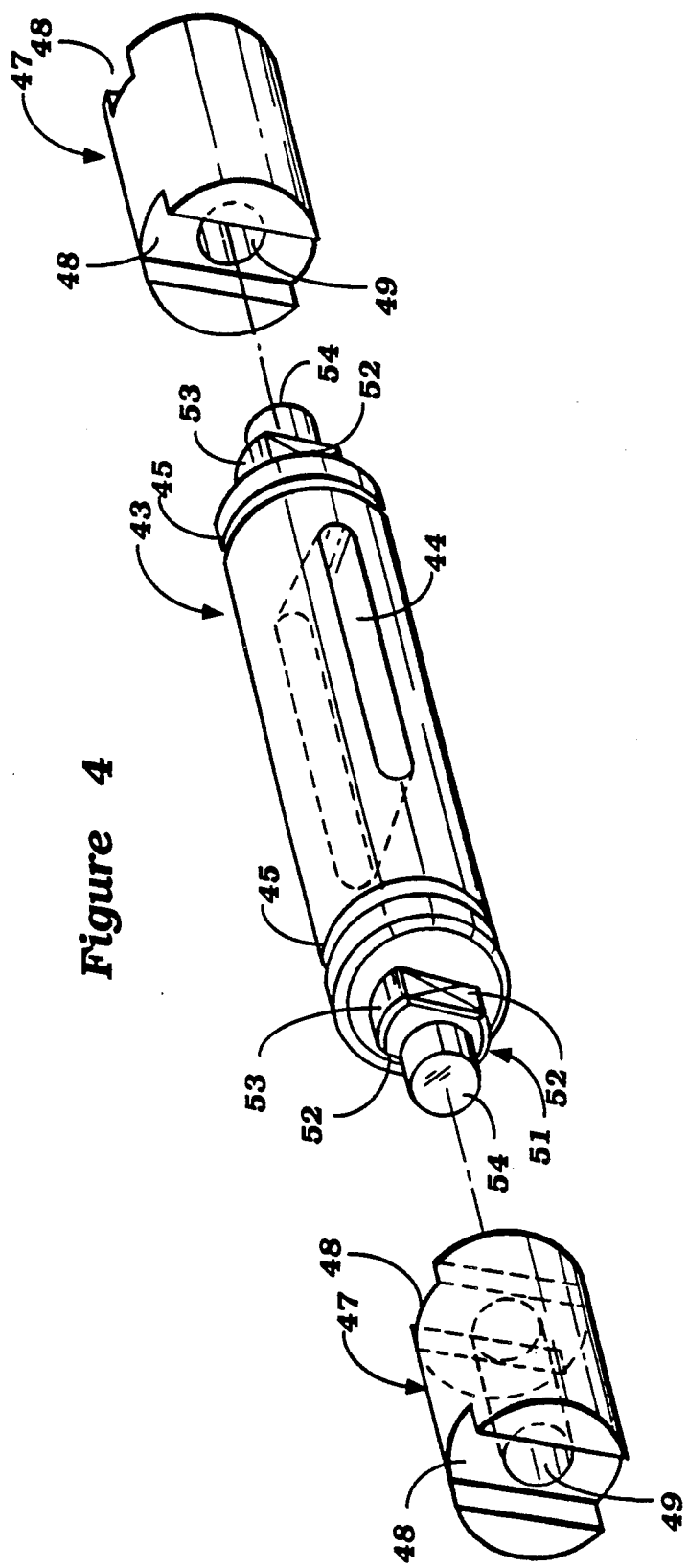
FIG. 4 is an exploded perspective view of one of the exhaust control valves and the interconnecting members that interrelated to the other exhaust valves.

It should be noted that he configuration of the bore 42 can readily distort due to torque down of the cylinder head 25, heat loading and other factors. For that reason, it is desirable to utilize a plurality of valve segments 43 rather than one long valve which might bind in operation under these circumstances. In order to ensure that the valves 43 will all operate in unison, however, adjacent valves 43 are interconnected by connecting members, indicating generally by the reference numeral 47 and having a construction as best seen in FIG. 4. Since the valve members only operate in a fully opened or a fully closed position, the permitted relative circumferential movement presents no problem.

Each connecting member 47 has a generally cylindrical configuration and is formed with slots 48 that extend across their ends. A bore 49 extends transversely through the connecting members 48.

Each valve member 43 has at its opposite ends a section 51 that has a pair of straight sides 52 which are interconnected at their opposite ends by curved sides 53. The distance between the sides 52 is slightly less than the width of the slots 48 so as to afford some clearance to accommodate misalignment due to the aforenoted factors. In addition, a cylindrical post 54 extends from the sections 51 and is received in the bores 49 with some clearance so as to allow axial and circumferential movement. As a result, the connection between the valve members 43 provided by the connecting members 47 will insure that the valve members 43 all move substantially in unison but circumferential and axial tolerance is accommodated.

At one end the bore 42 of the cylinder block is closed by a closure plug 55 that bears against the cylindrical projection 54 of the adjacent valve member 43. At the other end, there is provided a controller, indicated generally by the reference numeral 56 which is in the form of a stepping motor or the like. The motor 56 is connected by means of a coupling 57, which may be similar to the connecting members 47, to one end of the valve elements 43. A seal 58 encircles the coupling and provides sealing.

The motor 56 is controlled by means of a control 59 that is programmed so as to provide an on/off signal to operate the motor 56 and open and close the valve 43 as aforedescribed. The controller 59 receives parameters from the engine indicative of engine speed and throttle valve opening by suitable sensors and is programmed so as to open and close the exhaust control valves 43 in accordance with a program whereby under low speed, low load conditions the valves 43 are closed to provide a high compression ratio as aforenoted. However when the valves are open at the point indicated in FIG. 6 as the point a, then the compression ratio will be lowered to approximately 15 to 1 with the results now to be described.

Figure 5:
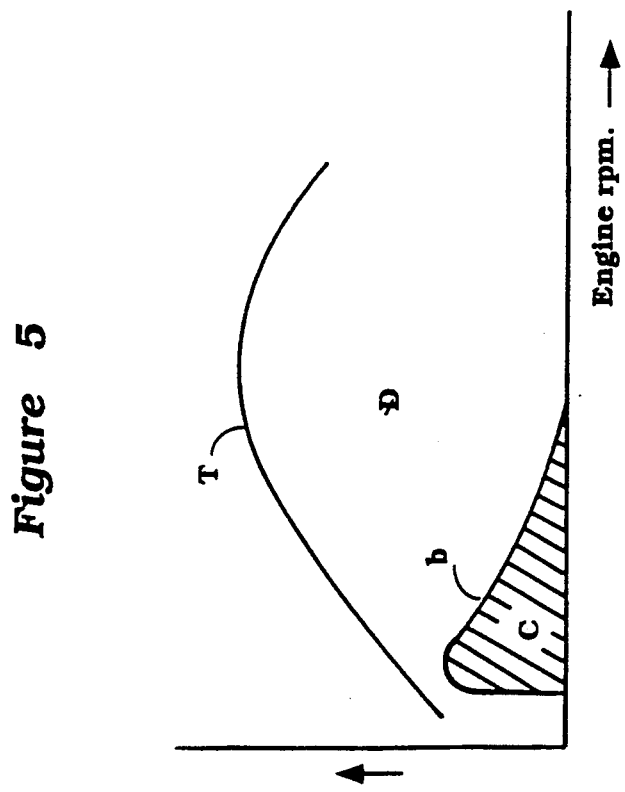
FIG. 5 is a graphical view showing the torque curve of the engine in relation to engine speed and also the timing of the opening and closing of the supplemental exhaust port relative to these characteristics.

The sequence of timing of the valves 43 is illustrated in FIG. 5 by the curve b that shows the range C when the control valves 43 are closed. As may be seen, if the engine load increases and the engine speed increases, the valves 43 will be moved from their closed positioned to their opened position. This provides torque curve as shown by the curve T in this figure.

Figure 6:
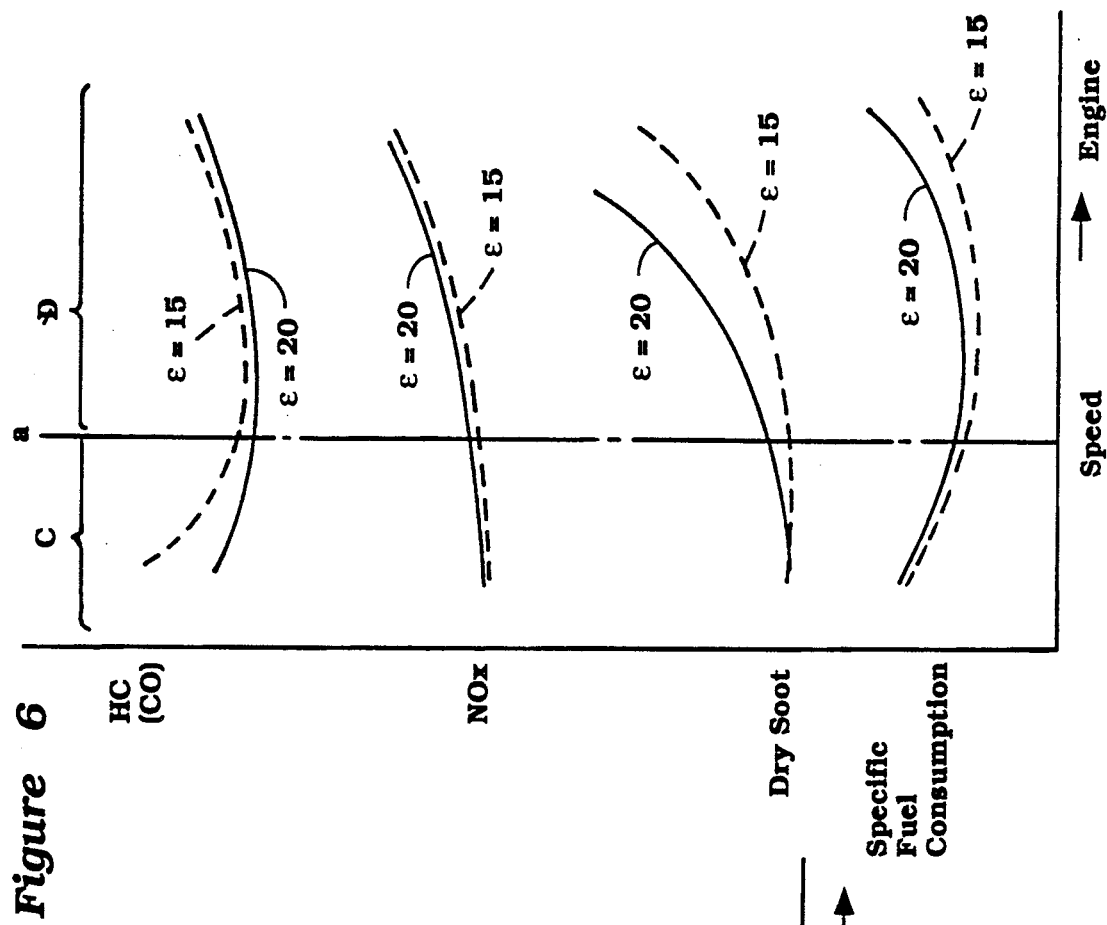
FIG. 6 is a graphical view showing the hydrocarbon or CO emissions, NOX emissions, dry soot emissions and specific fuel consumption for engines having varying compression ratios or with the valve open and closed.

Under this condition, the valves are maintained in their open position so as to lower the compression ratio the effects of which may be understood by reference to FIG. 6 wherein HC or CO, NOX, dry soot and specific fuel consumption are shown in relation to engine speed with the point a depicting the point at which the control valve operates. Hence, under the range of operation C the control valve will be closed and it will be noted from the solid line curves that CO or hydrocarbon emissions can be kept low without offering significant problems with NOX or dry soot emissions or high specific fuel consumption. However, as the speed and/or load increases, the performance characteristics at high compression ratio deteriorate in that dry soot and specific fuel consumption will begin to increase steeply. Therefore, under these conditions, the control valves 43 are opened and improved performance will result. Thus, the performance is increased through the use of the control valves.

Figure 2:
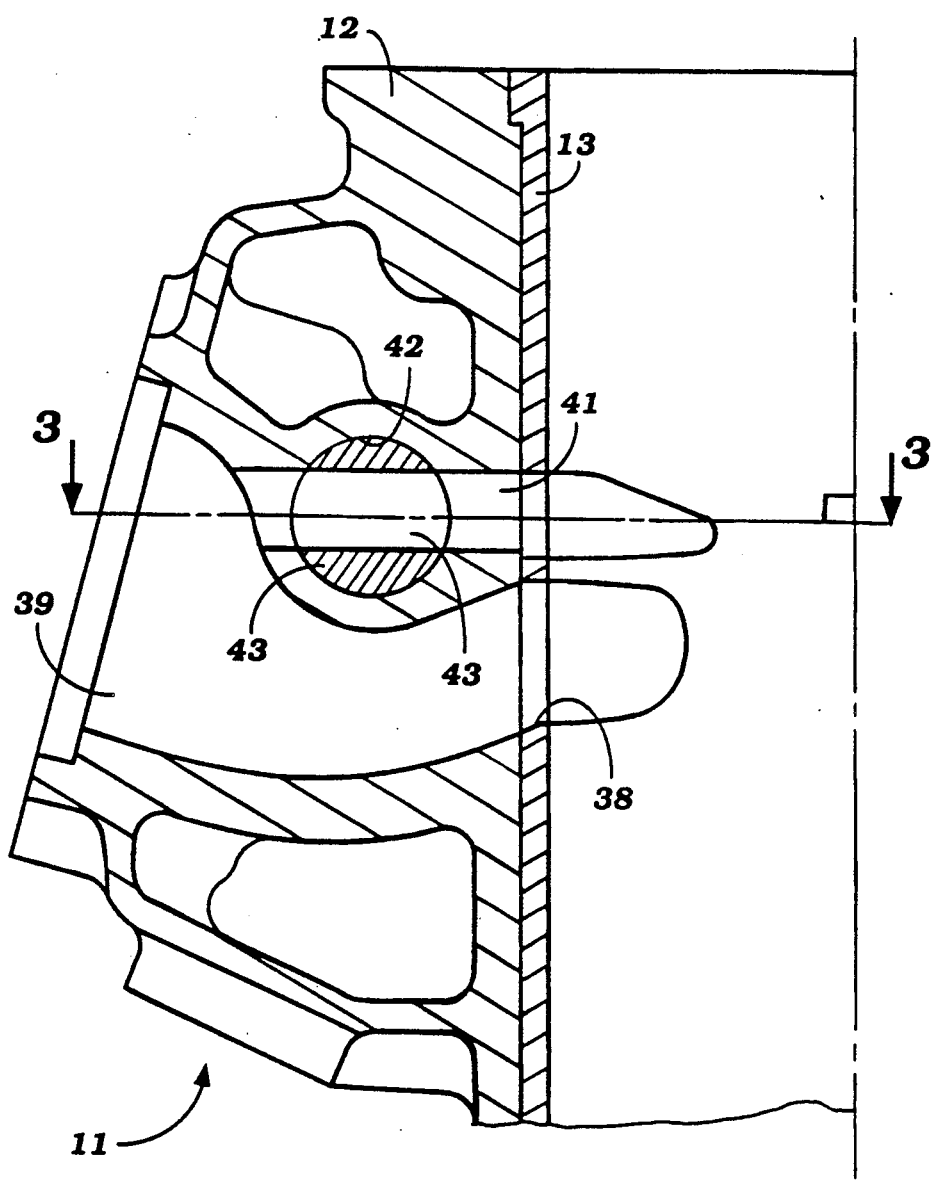
FIG. 2 is an enlarged cross sectional view taken through the exhaust port.

Referring to FIG. 1, it has already been noted that the engine is equipped with reed type valves 36. Inasmuch as the induction system only flows air, the reed type valves can cause noise under their closing operation. To avoid this noise, a small amount of lubricant which may collect in the crankcase chambers is delivered through a check valve assembly 61 to a conduit 62 that extends to a spray nozzle 63 that is positioned in the intake manifold 32 upstream of the check valve 34. The engine 11 is provided with a suitable separate lubricating system and some lubricant and/or fuel will accumulate in the crankcase chambers. This fuel will be drawn by the reduced pressure in the induction system and sprayed to the nozzle 63 to coat the cage and valve members of the check valve 34 and provide some damping and silencing. Of course, the amount of lubricant so delivered is quite small and will not have the deleterious effects of causing smoke in the exhaust.

From the foregoing description it should be readily apparent that the exhaust control mechanism described permits smooth and efficient operation of the exhaust control valves without adverse effects from distortion due to temperature or bolt loadings. Although the foregoing description is that of a preferred embodiment of the invention, various changes and modifications may be made without departing from the spirit and scope of the invention, as defined by the appended claims.

I claim:

1. An exhaust control valve arrangement for an internal combustion engine having a cylinder block having a plurality of in line cylinder bores each receiving a respective piston, an exhaust port extending through said cylinder block from each of said cylinder bores for delivering exhaust gases to the atmosphere, a bore extending through said cylinder block adjacent said cylinder bores and intercepting each of said exhaust ports, a plurality of rotatable valve members received in said bore for controlling the flow through respective of said exhaust ports, and tongue and groove means for coupling said valve members for simultaneous rotation while permitting relative and free axial movement of said valve members for accommodating distortion in said cylinder block.

2. An exhaust control valve arrangement for an internal combustion engine as set forth in claim 1, wherein the engine further includes a plurality of main exhaust ports extending from the cylinder bores and intersected by the first mentioned exhaust ports.

3. An exhaust control valve arrangement for an internal combustion engine as set forth in claim 1, wherein the valve means comprise cylindrical elements.

4. An exhaust control valve arrangement for an internal combustion engine as set forth in claim 3, wherein the cylindrical elements are formed with flow openings extending therethrough which communicate with the exhaust ports when the valve elements are in their opened position.

5. An exhaust control valve arrangement for an internal combustion engine as set forth in claim 4, wherein the engine further includes a plurality of main exhaust ports extending from the cylinders and intersected by the first mentioned exhaust ports.

6. An exhaust control valve arrangement for an internal combustion engine as set forth in claim 5, wherein the coupling means comprises couplings interposed between adjacent valve members and having connections thereto that accommodate free axial and circumferential movement.

7. An exhaust control valve arrangement for an internal combustion engine as set forth in claim 6, wherein the couplings and the valve elements had interacting cylindrical extensions and bores and slots and tongues for transmitting relative rotations therebetween.

8. An exhaust control valve arrangement for an internal combustion engine as set forth in claim 7 wherein the slots and bores are formed in the connecting members and the tongues and cylindrical projections are formed on the valve members.

* * * * *